United States Patent
Stein

(10) Patent No.: US 11,163,076 B2
(45) Date of Patent: Nov. 2, 2021

(54) METHOD FOR THE DETECTION OF NEUTRONS WITH SCINTILLATION DETECTORS USED FOR GAMMA RAY SPECTROSCOPY

(71) Applicant: TARGET SYSTEMELEKTRONIK GMBH & CO. KG, Wuppertal (DE)

(72) Inventor: Jürgen Stein, Wuppertal (DE)

(73) Assignee: TARGET SYSTEMELEKTRONIK GMBH & CO. KG, Wuppertal (DE)

( * ) Notice: Subject to any disclaimer, the term of this patent is extended or adjusted under 35 U.S.C. 154(b) by 175 days.

(21) Appl. No.: 16/678,087

(22) Filed: Nov. 8, 2019

(65) Prior Publication Data

US 2020/0072990 A1    Mar. 5, 2020

Related U.S. Application Data

(63) Continuation of application No. PCT/EP2018/061938, filed on May 8, 2018.

(30) Foreign Application Priority Data

May 8, 2017 (EP) .................... 17170025

(51) Int. Cl.
G01T 3/06 (2006.01)
G01T 1/202 (2006.01)
G01V 5/00 (2006.01)

(52) U.S. Cl.
CPC .............. *G01T 3/065* (2013.01); *G01T 1/202* (2013.01); *G01V 5/0091* (2013.01)

(58) Field of Classification Search
CPC ........... G01T 3/065; G01T 1/202; G01T 1/20; G01T 3/06; G01V 5/0091
USPC ................................... 250/390.11
See application file for complete search history.

(56) References Cited

U.S. PATENT DOCUMENTS

2009/0272910 A1* 11/2009 Grynyov .................... G01T 3/06
                                                            250/390.11
2013/0256520 A1  10/2013 Korkin et al.
2018/0275309 A1*  9/2018 Berheide ................ G01V 5/101

OTHER PUBLICATIONS

International Search Report issued by the International Searching Authority for corresponding International Patent Application No. PCT/EP2018/061938, dated Jul. 25, 2018.
Kyle Polack et al. "Dual-Particle Imager for Standoff Detection of Special Nuclear Material", IEEE Nuclear Science Symposium Conference Record, Oct. 23, 2011, pp. 1494-1500, IEEE.

(Continued)

*Primary Examiner* — David P Porta
*Assistant Examiner* — Gisselle M Gutierrez
(74) *Attorney, Agent, or Firm* — Myers Wolin, LLC

(57) ABSTRACT

A method of measurement of both gamma radiation and neutrons with energies above 500 keV is provided utilizing a scintillation crystal. The method includes allowing gamma quanta and neutrons to interact with the scintillation crystal, collecting light emitted by the scintillation crystal and letting that light interact with a photo detector, and amplifying the signal output. The method then digitizes the amplifier output signal, determines a charge collection time for each interaction measured, determining light decay times, separating signals with distinct decay times, determining a total charge collected from signals with the distinct decay times, and sorting charge signals in a spectrum. The method then counts signals with a second decay time and determines a count rate.

8 Claims, 1 Drawing Sheet

(56) References Cited

OTHER PUBLICATIONS

Soundara-Pandian et al., "Lithium Alkaline Halides-Next Generation of Dual Mode Scintillators", IEEE Transactions on Nuclear Science, Apr. 1, 2016, pp. 490-496, vol. 63, No. 2, IEEE Service Center, NY, NY.

Wen et al. "Measuring the scintillation decay time for different energy deposited by [gamma]-rays and neutrons in a $Cs_2LiYCl_6$:$Ce^{3+}$ detector" Nuclear Instruments & Methods in Physics Research, Section A: Accelerators, Spectrometers, Detectors, and Associated Equipment, Feb. 9, 2017, pp. 9-15, vol. 853, Elsevier BV, North-Holland, NL.

* cited by examiner

METHOD FOR THE DETECTION OF NEUTRONS WITH SCINTILLATION DETECTORS USED FOR GAMMA RAY SPECTROSCOPY

CROSS REFERENCE TO RELATED APPLICATIONS

This application is a continuation of International Application No. PCT/EP2018/061938, filed on May 8, 2018, which takes priority from European Application No. 17170025.5, filed on May 8, 2017, the contents of each of which are incorporated by reference herein.

TECHNICAL FIELD

The present invention relates to the field of radiation measurement, more specifically the measurement of gamma ($\gamma$) and neutron (n)-radiation for homeland security applications.

BACKGROUND

The most important radiation measurement in homeland security applications is the measurement and spectroscopy of gamma radiation, following nuclear decay reactions. Uranium as a material to be used for the construction of nuclear bombs is nearly stable, therefore not emitting a substantial amount of $\gamma$-radiation, but being subject to spontaneous fission, thereby emitting fast neutrons, that is neutrons with (kinetic) energies of 500 keV and more. In order to being able to detect such kind of materials also, there is a strong need for the additional detection of neutrons. As a consequence, most portable instruments for the measurement of illicit radiation do comprise of more than one detector.

The first detector is usually a scintillation detector, mostly made out of thallium doped sodium iodide (NaI(Tl)) scintillation crystals in combination with a photo detector, usually a photo multiplier tube (PMT). Gamma radiation entering the scintillation crystal, is mostly absorbed or scattered by electrons within the scintillation crystal, whereby the recoil electrons recombine over time, thereby emitting light. This recombination process takes some time, said time being dependent from the type and material the scintillation crystal is made of. The time interval during which one half of the excited electrons recombine in their ground state, thereby emitting light, is called light decay time. The scintillation crystal is capsuled with a window on one side, this window being transparent to the emitted light. Connected to the window is a photo detector, mostly a PMT, measuring the amount of light seen. This amount of light measured stands in a known relation to the energy deposed by the $\gamma$-radiation in the scintillation crystal, thus allowing to determine said energy deposed in the scintillation crystal.

The neutrons to be measured in such a portable device are detected in a separate detector, in many cases by a gas detector, comprising $^3$He. The measurement makes use of a nuclear reaction, namely the reaction n+$^3$He$\rightarrow$p+$^3$H. One of the reaction products, namely the proton p, is a charged particle which is to be finally measured. Other nuclear reaction to be utilized for neutron detection are n+$^6$Li$\rightarrow\alpha$+$^3$He or n+$^{10}$B$\rightarrow\alpha$+$^7$Li. The cross section of said nuclear reactions is very small for fast, but high for thermal neutrons, i.e. neutrons with an energy of less than 1 eV, so that a small detector which is to be used in a portable device is more or less able to detect thermal neutrons only. In order to detect the fast neutrons following a fission process, they have to be moderated first by using a moderator comprising preferably large quantities of hydrogen like paraffin, thus increasing the complexity, size and weight of the detector.

It would be an advantage if it would be possible to use a single detector, especially a scintillation detector, for the measurement and spectroscopy of both, fast neutrons and gamma radiation.

Share et al. disclosed in Nucl. Inst. Meth. 148 (1978) 531 that it is possible to distinguish $\gamma$-radiation and neutron induced nuclear reactions for neutron energies higher than 5 MeV with pulse shape discrimination. Bartle et al. have shown in Nucl. Inst. Meth. A 422 (1999) 54 that small inorganic scintillators may be used as neutron detectors especially for neutron energies between 6 and 15 MeV, again following a nuclear reaction and pulse shape discrimination.

Furthermore it is known from U.S. Pat. No. 8,658,983 B2 to use a scintillation crystal for the detection, comprising a substantial amount of an isotope with a large fast neutron interaction cross-section and with a neutron interaction cross-section which results from a unique nuclear reaction, rather than a combination of reactions. The disadvantage of this method is that there is a need to make use of a nuclear reaction, especially between a neutron and a specific isotope.

In order to address the important neutron detection issue, at least when it comes to the detection of thermal neutrons, Saint Gobain recently developed a Lithium-Sodium Iodine crystal called NaIL with pulse shape discrimination capabilities. It relies on the often used n+$^6$Li$\rightarrow\alpha$+$^3$He+4.78 MeV reaction and the well known fact that alphas cause a different decay time in the NaI(Tl) scintillator compared to gammas.

In a recent publication by Yakushev et al, Nucl. Inst. Meth. A 848 (2017) 162, it is described that a detector utilizing an iodine containing scintillation crystal like NaI (Tl) can be used to detect thermal neutrons using the decay of $^{128}$I with an energy level of 137.8 keV, resulting from the capture of thermal neutrons by iodine nuclei in NaI and CsI scintillation crystals, that level having a decay time of 845 ns. The background discrimination is done by using a delayed coincidence technique with a several microsecond delay time window.

In astrophysics, especially when searching for Weakly Interacting Massive Particles (WIMP) there is a need to distinguish between WIMP nuclear recoil signals and electron recoil backgrounds from $\gamma$-radiation. As described by Kim et al., DPF2015-238, the different time distributions of the photoelectrons produced by nuclear and electronic recoils in a NaI scintillation crystal make discriminate WIMP-nuclear recoil signals from electron recoil backgrounds. However, detectors used for WIMP search are big and heavy usually several kilograms up to 200 kg and more—as there is a need to detect interactions with count rates in the order of one WIMP interaction per day. They are therefore shielded as good as possible against background radiation so that the count rate for radiation other than WIMP interactions is as low as possible, usually far below one interaction per second.

SUMMARY

Therefore, it is an object of the present invention to provide a method for the use in homeland security applications, allowing the detection of both fast neutrons and gamma radiation with a simple and light weight detector, being capable of handling relevant count rates necessary in homeland security detection devices.

This problem is solved by a method as claimed. Preferred embodiments are described in the dependent claims.

More specifically, the invention relates to a method of measurement of both gamma radiation and neutrons with energies above 500 keV—fast neutrons—for the use in homeland security applications, preferably in portable handheld devices, utilizing a scintillation crystal, said scintillation crystal having a first light decay time (T1) following the interaction of a gamma quant with the scintillation crystal and a second and shorter light decay time (T2) following the interaction of a fast neutron with the scintillation crystal, a photo detector together with an amplifier, as well as sampling Analog to Digital Converters—ADC—and a digital signal processing device including a Multi-Channel-Analyzer, said devices selected in a way they are able to perform a pulse shape discrimination, being able to distinguish light decay times of a few nanoseconds up to several microseconds, and to process count rates of more than 10 counts per second for interactions of gamma quanta and of more than 1 count per second for interactions of neutrons with the scintillation crystal. The method does comprise the steps of allowing gamma quanta and neutrons to interact with the scintillation crystal, collecting the light, emitted by the scintillation crystal, guiding it to a glass window optically coupled to the scintillation crystal and letting that light interact with a photo detector, amplifying the signal output from the photo detector with a suitable amplifier, preferably a photomultiplier tube—PMT—thus generating an amplifier output signal, digitizing the amplifier output signal, determining the charge collection time for each interaction measured, determining the light decay time of the scintillator from said charge collection time for each interaction measured, separating the signals with a first decay time (T1) from those with a second decay time (T2), determining the total charge (Q1) collected for each signal with a first decay time (T1), that total charge being a measure for the energy deposed in the scintillation crystal, sorting said total charge signals (Q1) in a spectrum, i.e. with by using a Multi-Channel-Analyzer (MCA), said spectrum representing the energy distribution of the gamma quants having deposed at least 10 keV and therefore at least a part of their energy in the scintillation crystal, counting the signals with a second decay time (T2) and determining the count-rate, that is the number of signals per given time interval, that count rate being a measure for the number of neutrons having deposed at least part of their energy in the scintillation crystal.

Preferably, the scintillation crystal is being one of NaI (Tl), CsI, NaIL, LiI, CLYC, CLLB, CLLBC, LaBr, GAGG, GAGYG. Even more preferably, the scintillation crystal and the corresponding electronics used is small enough to be used in a handheld portable device.

Another embodiment relates to a detector where the glass window between the scintillation crystal and the photo detector is comprising Li-Glass, the method comprising the additional steps of allowing neutrons with energies of less than 1 keV—thermal neutrons—to interact with the Li-Glass, collecting the light, emitted by the Li-Glass following the interaction of a thermal neutron with Li with a third light decay time (T3), said third light decay time being in the order of 100 ns, and letting that light interact with the photo detector, separating the signals with a first decay time (T1) from those with a second decay time (T2) and those with a third decay time (T3), counting the signals with a third decay time (T3) and determining the count-rate, that is the number of signals per given time interval, that count rate being a measure for the number of thermal neutrons having deposed at least part of their energy in the Li-Glass. The results achieved are even better when the Li-glass selected does comprise an enhanced percentage of $^6$Li.

In yet another embodiment the method does comprise the additional steps of determining the count rate of signals with a first decay time (T1) and a total charge (Q1), said total charge (Q1) representing gamma energies 3 MeV and 9 MeV, and adding said count rate to the count rate of signals with a second decay time (T2).

In yet another embodiment, the method does comprise the additional steps of sorting the signals with a second decay time (T2) and a total charge of (Q2) in a spectrum, i.e. by using a Multi-Channel-Analyzer (MCA), said spectrum representing the energy distribution of the neutrons with energies larger than 500 keV (fast neutrons).

In case a detector with a Li-glass is used, it is advantageous to make use of the additional steps of sorting the signals with a third decay time (T3) and a total charge of (Q3) in a spectrum, i.e. by using a Multi-Channel-Analyzer (MCA), said spectrum representing the energy distribution of the neutrons with energies less than 1 eV (thermal neutrons).

The inventor realized for the first time, that a pure NaI(Tl) scintillation detector together with an advanced Pulse Shape Analysis approach is capable of measuring both, gamma radiation and fast neutrons, as well as of distinguishing between both types of radiation even within a small handheld detector, capable of handling radiation with a comparably high dose, that is with a high count rate as necessary in homeland security applications. The method according to the invention allows for the first time to use a cheap, off-the-shelf NaI(Tl) detector together with digital signal processing as reliable neutron detector. Pure NaI(Tl) detects neutrons, which can now be separated from gamma detection with elaborate digital pulse shape discrimination. Even neutron spectrometry seems possible if the measurement statistics for neutrons is sufficient. The neutron detection capacity has been known for large multi-kilogram size detectors, in a very well controlled underground environment with extremely low count rates and sophisticated suppression of electronic noise and other types of radiation. The present invention takes it to the handheld realm.

BRIEF DESCRIPTION OF THE DRAWINGS

Some embodiments of the invention are explained in the following with reference to the figures. Those show the following.

DETAILED DESCRIPTION

Figure 1:
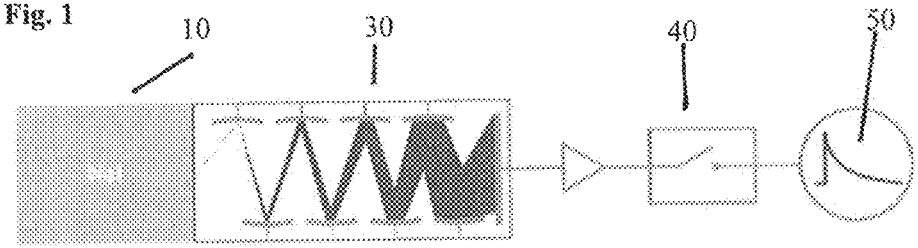
FIG. 1 A schematic setup of a detector to be used with the invention.

FIG. 1 shows a detector to be used with the invention. Shown is a NaI(Tl) scintillation crystal (10), with which gamma quanta and neutrons interact, producing recoil electrons, following a gamma interaction, and recoil nuclei, following a neutron interaction. The scintillation light is led to an optical window (not shown) which optically couples the scintillation crystal to a light readout or the photo detector, in this case a PMT (30), the output at the PMT anode being connected to the detector electronics (40), shown schematically only. The output signal (50) is shown on the right side of the picture. The current of the light readout is sampled and digitized. The digitization produces a time series data stream with integer numbers that are stored on a server for offline evaluation.

More specifically, an NaI(Tl) scintillation detector generates current pulses with random fluctuations for each ionizing particle hitting its scintillation crystal. The detector current is sampled and digitized at a constant rate producing a time series of integer values. The pulse time series starts with the detection of the first photo electron above the noise threshold. It shall end when the pulse has decayed to a fraction of its maximum height. A pulse waveform captures the scintillation process, that was caused by a particle or photon. The scintillation excitation and scintillation light detection are quantized, and the total area and all sampled values exhibit statistical fluctuations ruled by the statistics of the scintillation photons release.

For further evaluation purposes, a measurement was conducted, using the following basic experimental setup. A passive voltage divider, an NaI(Tl) detector and a digitizer have been used. The PMT bias provides high pulse linearity with a linear, passive 12 MOhm divider with 100 nF parallel blocking capacitors at each dynode. The digitizer is directly coupled to the anode through a first-order passive Bessel filter. The sampling rate is 250 Ms/s, with a digitization depth of 14 bit, and low, 2.5 bit RMS total electronic and digitization noise.

In order to conduct the method claimed with the invention, an appropriate read-out and signal processing is necessary.

Figure 2:
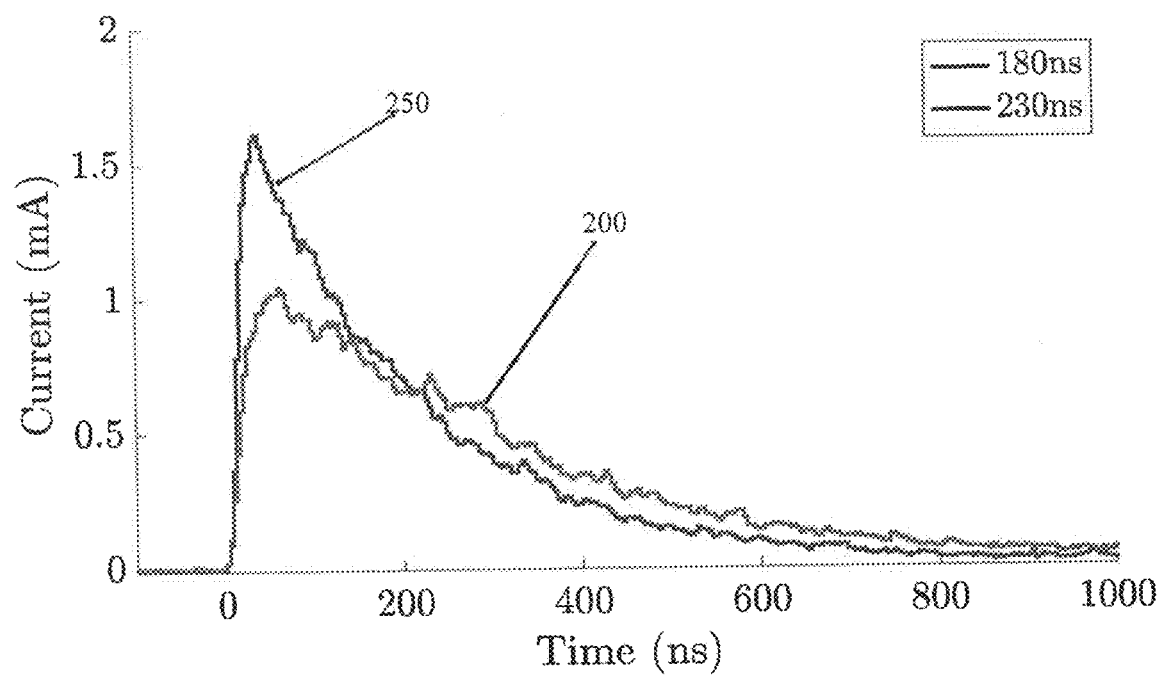
FIG. 2 Detector output signals for fast neutrons and gamma radiation.

FIG. 2 shows exemplary digitized current pulses of the NaI(Tl) detector exposed to a $^{252}$Cf source. Identified gamma pulses (200) and neutron pulses (250) are shown. It can be seen that the pulse shapes are different, which is due to the different light decay times of 180 ns for neutron interactions and 230 ns for gamma interactions.

Figure 3:
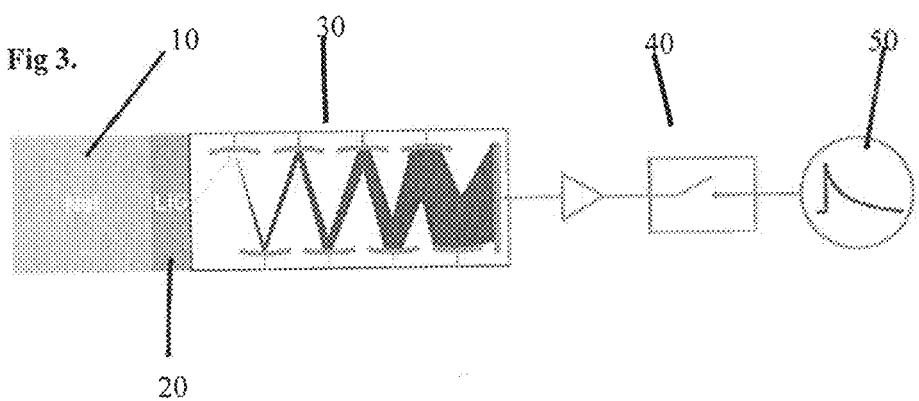
FIG. 3 A schematic setup of a detector with a Li-Glass window to be used with the invention.

FIG. 3 shows a phoswitch (photo-sandwich) configuration consisting of a NaI(Tl) crystal, a Li-glass disk as an entrance window to the photo detector and a PMT. With such a detector it is possible to improve the claimed method by adding further steps. The $^6$Li of the Li-glass has a fairly high cross section for thermal neutrons with the reaction described above. The light decay time in said Li-glass is in the order of T3=100 ns. When combined with a NaI(Tl) scintillation crystal, showing light decay times in the order of T1=230 ns for a gamma induced light decay and about T2=180 ns for a fast neutron induced light decay, the light output of the described phoswitch detector comprises measurements with three different light decay times T1, T2 and T3, which can be distinguished. Therefore, the three different event types can be separated from each other, so that all three interactions with gamma radiation and fast and thermal neutrons can be counted and evaluated separately, thus allowing an independent and parallel detection with just one type of detector within a handheld device.

The inventive method, making use of three different light decay times following from different types of interactions—electron recoil for gamma radiation, nuclear recoil for fast neutron detection and a nuclear reaction for thermal neutron detection—can also be applied to an NaIL detector as developed by Saint-Gobain for the detection of just thermal neutrons and gamma radiation, as it does allow to register fast neutrons with that said pulse shape discrimination.

What is claimed is:

1. A method of measurement of both gamma radiation and neutrons with energies above 500 keV—fast neutrons—for the use in homeland security applications, preferably in portable handheld devices, utilizing a scintillation crystal, said scintillation crystal having a first light decay time (T1) following the interaction of a gamma quant with the scintillation crystal and a second and shorter light decay time (T2) following the interaction of a fast neutron with the scintillation crystal, a photo detector together with an amplifier, as well as sampling Analog to Digital Converters—ADC—and a digital signal processing device including a Multi-Channel-Analyzer, said devices selected in a way they are able to perform a pulse shape discrimination, being able to distinguish light decay times of a few nanoseconds up to several microseconds, and to process count rates of more than 10 counts per second for interactions of gamma quanta and of more than 1 count per second for interactions of neutrons with the scintillation crystal, comprising the steps of allowing gamma quanta and neutrons to interact with the scintillation crystal, collecting the light, emitted by the scintillation crystal, guiding it to a glass window optically coupled to the scintillation crystal and letting that light interact with a photo detector, amplifying the signal output from the photo detector with a suitable amplifier, preferably a photomultiplier tube—PMT—thus generating an amplifier output signal, digitizing the amplifier output signal, determining the charge collection time for each interaction measured, determining the light decay time of the scintillator from said charge collection time for each interaction measured, separating the signals with a first decay time (T1) from those with a second decay time (T2), determining the total charge (Q1) collected for each signal with a first decay time (T1), that total charge being a measure for the energy deposed in the scintillation crystal, sorting said total charge signals (Q1) in a spectrum, i.e. with by using a Multi-Channel-Analyzer (MCA), said spectrum representing the energy distribution of the gamma quants having deposed at least 10 keV and therefore at least a part of their energy in the scintillation crystal, counting the signals with a second decay time (T2) and determining the count-rate, that is the number of signals per given time interval, that count rate being a measure for the number of neutrons having deposed at least part of their energy in the scintillation crystal.

2. The method of claim 1, the scintillation crystal being one of NaI(Tl), CsI, NaIL, LiI, CLYC, CLLB, CLLBC, LaBr, GAGG, GAGYG.

3. The method of claim 2, wherein the scintillation crystal and the corresponding electronics used are small enough to be used in a handheld portable device.

4. The method of claim 1, wherein the glass window between the scintillation crystal and the photo detector comprises Li-Glass, the method comprising the additional steps of allowing neutrons with energies of less than 1 keV—thermal neutrons—to interact with the Li-Glass, collecting the light, emitted by the Li-Glass following the interaction of a thermal neutron with Li with a third light decay time (T3), said third light decay time being in the order of 100 ns, and letting that light interact with the photo detector, separating the signals with a first decay time (T1) from those with a second decay time (T2) and those with a third decay time (T3), counting the signals with a third decay time (T3) and determining the count-rate, that is the number of signals per given time interval, that count rate being a measure for the number of thermal neutrons having deposed at least part of their energy in the Li-Glass.

5. The method of claim 4, wherein the Li-glass selected does comprise an enhanced percentage of $^6$Li.

6. The method of claim 1, further comprising the additional steps of determining the count rate of signals with a first decay time (T1) and a total charge (Q1), said total charge (Q1) representing gamma energies between $E\gamma=3$ MeV and $E\gamma=9$ MeV, and adding said count rate to the count rate of signals with a second decay time (T2).

7. The method of claim 1, further comprising the additional steps of sorting the signals with a second decay time (T2) and a total charge of (Q2) in a spectrum, i.e. by using a Multi-Channel-Analyzer (MCA), said spectrum representing the energy distribution of the neutrons with energies larger than 500 keV (fast neutrons).

8. The method of claim 4, further comprising the additional steps of sorting the signals with a third decay time (T3) and a total charge of (Q3) in a spectrum, i.e. by using a Multi-Channel-Analyzer (MCA), said spectrum representing the energy distribution of the neutrons with energies less than 1 eV (thermal neutrons).

\* \* \* \* \*